US007113454B2

(12) United States Patent
Matsuoka

(10) Patent No.: US 7,113,454 B2
(45) Date of Patent: Sep. 26, 2006

(54) DISC PLAYER AND METHOD OF PLAYING BACK DISC

(75) Inventor: Masamichi Matsuoka, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 126 days.

(21) Appl. No.: 10/394,629

(22) Filed: Mar. 21, 2003

(65) Prior Publication Data

US 2004/0032800 A1 Feb. 19, 2004

(30) Foreign Application Priority Data

Mar. 22, 2002 (JP) .............................. 2002-080278

(51) Int. Cl.
*G11B 7/00* (2006.01)
(52) U.S. Cl. ................. 369/30.04; 369/30.08
(58) Field of Classification Search ............... 369/53.2, 369/275.3, 47.1, 30.04, 30.08, 30.09, 30.68, 369/30.64, 53.22
See application file for complete search history.

(56) References Cited

U.S. PATENT DOCUMENTS 5,734,787 A * 3/1998 Yonemitsu et al. ......... 386/111
6,072,759 A * 6/2000 Maeda et al. ............ 369/59.25
6,425,018 B1 7/2002 Kaganas et al.
6,530,009 B1 * 3/2003 James ........................ 711/171
6,928,433 B1 * 8/2005 Goodman et al. ............. 707/4

OTHER PUBLICATIONS

"Sony Portable CD Player Operating Instructions," 2002 Sony Corporation.
"CD Walkman® Compact Disc/MP3 Disc Player D-CJ01—Specifications," www.sonystyle.com.
"CD Walkman® Compact Disc/MP3 Disc Player D-CJ01—Overview, Features," www.sonystyle.com.

* cited by examiner

*Primary Examiner*—Nabil Hindi
(74) *Attorney, Agent, or Firm*—Brinks Hofer Gilson & Lione

(57) ABSTRACT

A disc player for playing back a disc that includes a plurality of folders, each folder including music files, includes a folder specifying unit for selecting a folder playback mode and specifying one folder and a playback unit for reading the music files in the specified folder from the disc to sequentially play back the read music files in the folder playback mode. The playback unit reads and plays back the music files from the disc in an order determined by a playback order determining unit in a folder random playback mode. The playback unit repeatedly plays back at least one music file in the specified folder in a folder repeat playback mode. The playback unit scans and plays back the first few seconds of each music file in the folder in a folder scan playback mode.

4 Claims, 10 Drawing Sheets

FIG. 7A

ISO9660 VOLUME

| VOLUME DESCRIPTOR | PATH TABLE | DIRECTORY | (DATA) | DIRECTORY |
|---|---|---|---|---|

FIG. 7B

PRIMARY VOLUME DESCRIPTOR STRUCTURE

| BYTE | DATA | BYTE | DATA |
|---|---|---|---|
| 1 | VOLUME DESCRIPTOR TYPE ("1" FOR PYD) | 157–190 | DIRECTORY RECORD FOR ROOT DIRECTORY |
| 2–6 | SPECIFICATION IDENTIFIER ("CD001") | 191–318 | VOLUME SET IDENTIFIER |
| 7 | VOLUME DESCRIPTOR VERSION NUMBER | 319–446 | PUBLISHER IDENTIFIER |
| 8 | UNUSED | 447–574 | DATA EDITOR IDENTIFIER |
| 9–40 | SYSTEM IDENTIFIER | 575–702 | APPLICATION SYSTEM IDENTIFIER |
| 41–72 | VOLUME IDENTIFIER | 703–739 | COPYRIGHT FILE IDENTIFIER |
| 73–80 | UNUSED | 740–776 | ABSTRACT FILE IDENTIFIER |
| 81–88 | VOLUME SPACE SIZE | 777–813 | BIBLIOGRAPHY FILE IDENTIFIER |
| 89–120 | UNUSED | 814–830 | DATE AND TIME OF VOLUME CREATION |
| 121–124 | VOLUME SET SIZE | 831–847 | DATE AND TIME OF VOLUME UPDATE |
| 125–128 | VOLUME SEQUENCE NUMBER | 848–864 | DATE AND TIME OF VOLUME EXPIRATION |
| 129–132 | LOGICAL BLOCK SIZE | 865–881 | DATE AND TIME OF VOLUME ISSUANCE |
| 133–140 | PATH TABLE SIZE | 882 | FILE STRUCTURE VERSION NUMBER |
| 141–144 | L-TYPE LOGICAL PATH TABLE LOCATION | 883 | (RESERVED) |
| 145–148 | ARBITRARY L-TYPE LOGICAL PATH TABLE LOCATION | 884–1395 | APPLICATION SYSTEM USE |
| 149–152 | M-TYPE LOGICAL PATH TABLE LOCATION | 1396–2048 | (RESERVED) |
| 153–156 | ARBITRARY M-TYPE LOGICAL PATH TABLE LOCATION | | |

TO Ⓐ

DISC PLAYER AND METHOD OF PLAYING BACK DISC

BACKGROUND

1. Field of the Invention

The present invention relates to disc players that play back discs, each including music files in a plurality of folders and managing the music files for every folder, and, more particularly, to a disc player capable of playing back all music files in each folder.

2. Description of the Related Art

Data is recorded on a CD-R/RW medium in a disc-at-once mode, a session-at-once mode, a track-at-once mode, or the like.

In the disc-at-once mode, the lead-in, data, and the lead-out are written as one continuous portion on a disc, without any interruptions, until the entire data set is transferred to the disc and additional data cannot be written on the disc. Compact disc digital audio (CD-DA) adopts this mode.

In the session-at-once mode, the lead-in, data, and the lead-out of a session are written as one continuous portion on a disc and additional data can be written on the disc. The area between the lead-in and the lead-out, inclusively, is referred to as the session.

In the track-at-once mode, a session is written in a number of tracks and additional data can be written on the disc. After the data is written on all tracks, the lead-in and the lead-out of the corresponding session are written. When the data is written on a disc in the track-at-once mode, the lead-in LI, data (program area) P, and the lead-out LO respectively have a seam at the head thereof and a seam at the trail thereof, as shown in FIG. 4. The head seam is referred to as a run-in and the trail seam is referred to as a run-out.

Writing data in sessions in the track-at-once mode produces a multi-session disc. FIG. 5 shows the structure of a multi-session disc. In the multi-session disc, each time a session is appended to the disc, the lead-in areas LI1 to LI3 are respectively provided at the heads of the program areas P1, P2, and P3 and the lead-out areas LO1 to LO3 are respectively provided at the trails thereof. Volume descriptors, path tables, and so on (described below) of the sessions additionally written and of the sessions already recorded are written in the lead-in areas LI1 to LI3. Accordingly, reading the lead-in area of the last session reveals the file structure of the entire disc volume. Compressed music data of, for example, MP3 (MPEG-1 audio layer 3) and WMA (Windows media audio) can be written in the sessions of the discs shown in FIGS. 4 and 5 in a CD-ROM (compact disc read only) format.

FIG. 6 shows the structure of a sector in a CD-ROM mode 1. In the CD-ROM mode 1, a sector has a size of 2,352 (=24×98) bytes. One sector contains 98 frames (one frame has a size of 24 bytes) and includes the following:

(1) synchronization (synchronization signal) data SKD of 12 bytes
(2) a header HDD of four bytes
(3) user data USD of 2,048 bytes
(4) ancillary data EDCC of 288 bytes for error correction and detection.

Of the four bytes of the header HDD, three bytes (MIN/SEC/SECTOR) contain address information and the remaining one byte contains mode information indicating the type of data. The address information basically includes the same data as a sub-code Q channel and is represented as minute/second/sector format, like the sub-code of the CD-DA. Also, the synchronization signal, the sub-code, and an error correcting code (CIRC) are appended to each frame, as in the signal unit format in the CD-DA.

When the data is written on the CD-ROM, the data is divided into sectors and the sub-code and the CIRC are appended, as in the CD-DA. After the data is modulated by EFM (eight-to-fourteen modulation), it is written on the CD-ROM. The data is read out from the CD-ROM for every sector with the sub-code (the absolute address of the Q channel).

As described above, the data on the CD-ROM is divided into logical sectors, each having a size of 2,048 bytes and containing 2n logical blocks (it is often the case that n=0). A volume has a system area that uses the first 16 sectors (logical sector numbers from 0 to 15) and a data area. In the case of a volume conforming to the ISO9660 standards, the data area has a volume descriptor BDC, a path table PTH, directories DRT, and data DT, as shown in FIG. 7A. Volume descriptors include a primary volume descriptor, a supplementary volume descriptor, a volume partition descriptor, and so on.

The primary volume descriptor contains information such as a volume identifier A0, logical block size A1, path table size A2 for determining a file structure (FIG. 8), and path table location A3, as shown in FIG. 7B.

The path table contains information such as a directory identifier (folder name) B1, a parent directory number B2, and record location (extent location) B3 of a directory (for example, a file) included in a folder (directory), as shown in FIG. 7C. A plurality of path tables of directories that has a root directory as the parent directory is continuously written on the CD-ROM.

The directory contains information such as a file identifier C1, starting address of file (extent location) C2, file flag C3, and data size of file C4, as shown in FIG. 7D. Directory records of a plurality of files in a directory (folder) are continuously written on the CD-ROM.

FIG. 8 shows an exemplary file structure. The root directory has a plurality of directories (folders: R&B, ROCK, JAZZ, POPS, . . . ), the folder ROCK has subfolders ROCKMAN and ROCKWOMAN, and the folder R&B has a plurality of MP3 files (MP3 music file) RB-1, RB-2, . . . . Similarly, other folders have some MP3 music files. This file structure can be determined by analysis of the primary volume descriptor BDC, the path table PTH, and the directories DRT that are described above.

Heretofore, the playback of discs has been controlled for every disc. However, such playback control has disadvantages in the playback of the disc that has folders including music files for the following reason.

A maximum of 255 music files can be written on a CD-R/RW medium in the CD-ROM format with a compression technique such as the MP3. However, more than 255 music files can be written depending on the capacity of a recording medium or the specifications of writing software. As described above, in the CD-ROM format, the recording structure of music data on a disc can be described with a primary volume descriptor, a path table, and directories. For example, when a user prepares a music disc, a folder is created for every category (R&B, ROCK, JAZZ, POPS, . . . ), as shown in FIG. 8, and music files corresponding to each category are added to each folder. This file structure is described with the primary volume descriptor, the path table, and the directories. However, when the music discs are played back with the conventional disc-based playback mode, it is not possible to just play back the music files from one category, for example, ROCK or JAZZ.

BRIEF SUMMARY

Accordingly, it is an object of the present invention to provide a disc player capable of playing back all music files in each folder. It is another object of the present invention to provide a disc player capable of playing back music files in a designated folder in a folder random playback mode, a folder repeat playback mode, or a folder scan playback mode.

In one embodiment of the present invention, a disc player for playing back a disc includes a plurality of folders, each folder including music files. The disc player includes a folder specifying unit for selecting a folder playback mode and specifying one folder and a playback unit for reading the music files in the specified folder from the disc to sequentially play back the read music files in the folder playback mode.

The disc player preferably further includes a folder-random-playback selecting unit for selecting a folder random playback mode and a playback order determining unit for determining an order of playing back all the music files in the specified folder. In the folder random playback mode, the playback unit reads and plays back the music files from the disc in the order determined by the playback order determining unit.

The disc player preferably further includes a folder-repeat-playback selecting unit for selecting a folder repeat playback mode. In the folder repeat playback mode, the playback unit repeatedly plays back at least one music file in the specified folder.

The disc player preferably further includes a folder-scan-playback selecting unit for selecting a folder scan playback mode. In the folder scan playback mode, the playback unit scans and plays back the first few seconds of each music file in the folder.

With such features, all music files can be played back for each folder and also the music files can be played back in the folder random playback mode, the folder repeat playback mode, and the folder scan playback mode for every folder. As a result, a user can conveniently play back only desired music files.

The above and other objects, features, and advantages of the present invention will become clear from the following description of the preferred embodiments taken in conjunction with the accompanying drawings.

BRIEF DESCRIPTION OF THE DRAWINGS

FIG. 7A shows the structure of a volume conforming to the ISO9660 standards;

FIG. 7B shows the structure of a primary volume descriptor in the volume;

DETAILED DESCRIPTION OF THE DRAWINGS AND THE PRESENTLY PREFERRED EMBODIMENTS

Figure 1:
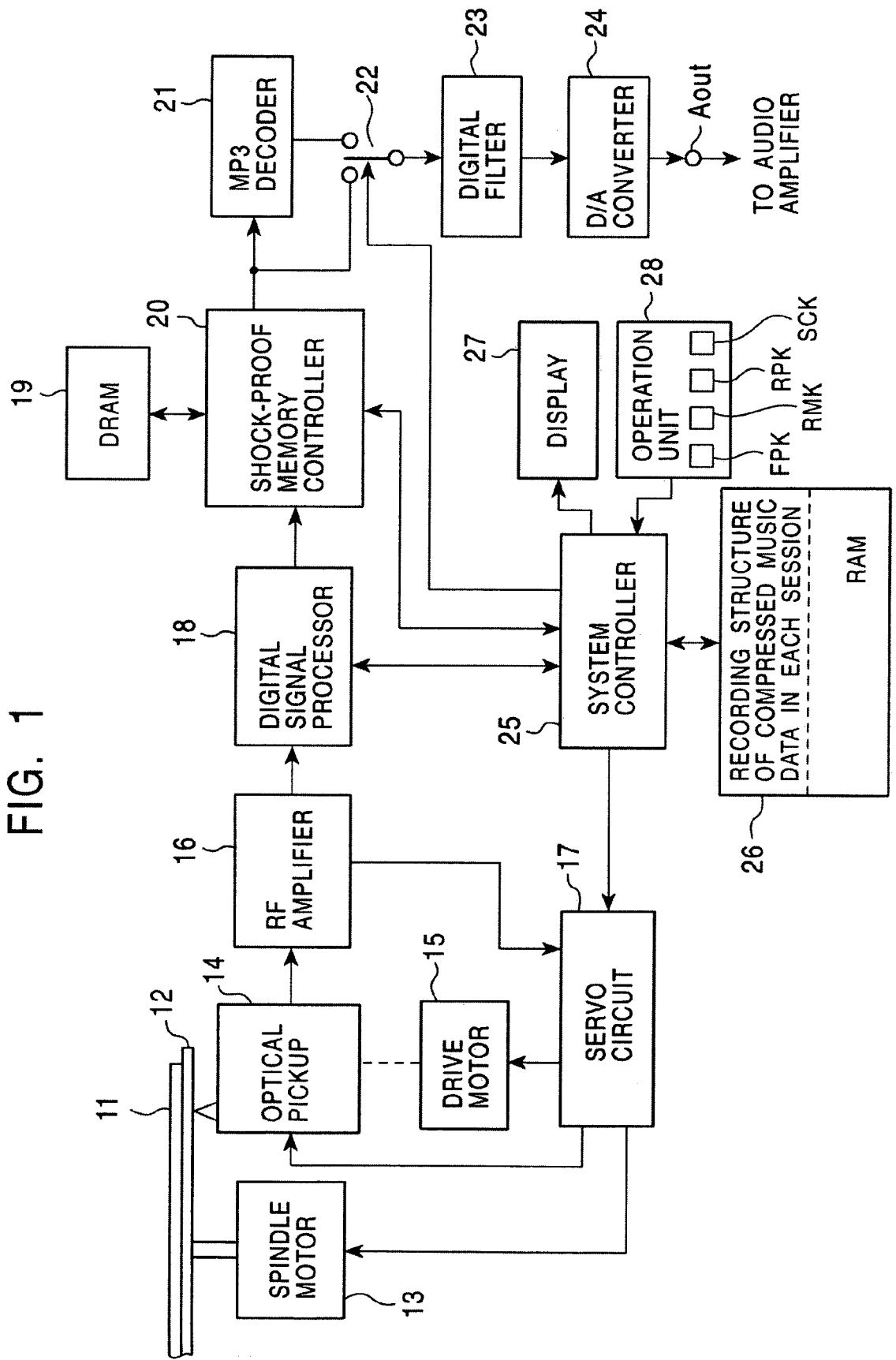
FIG. 1 is a block diagram showing the structure of a disc player according to an embodiment of the present invention.
Figure 2:
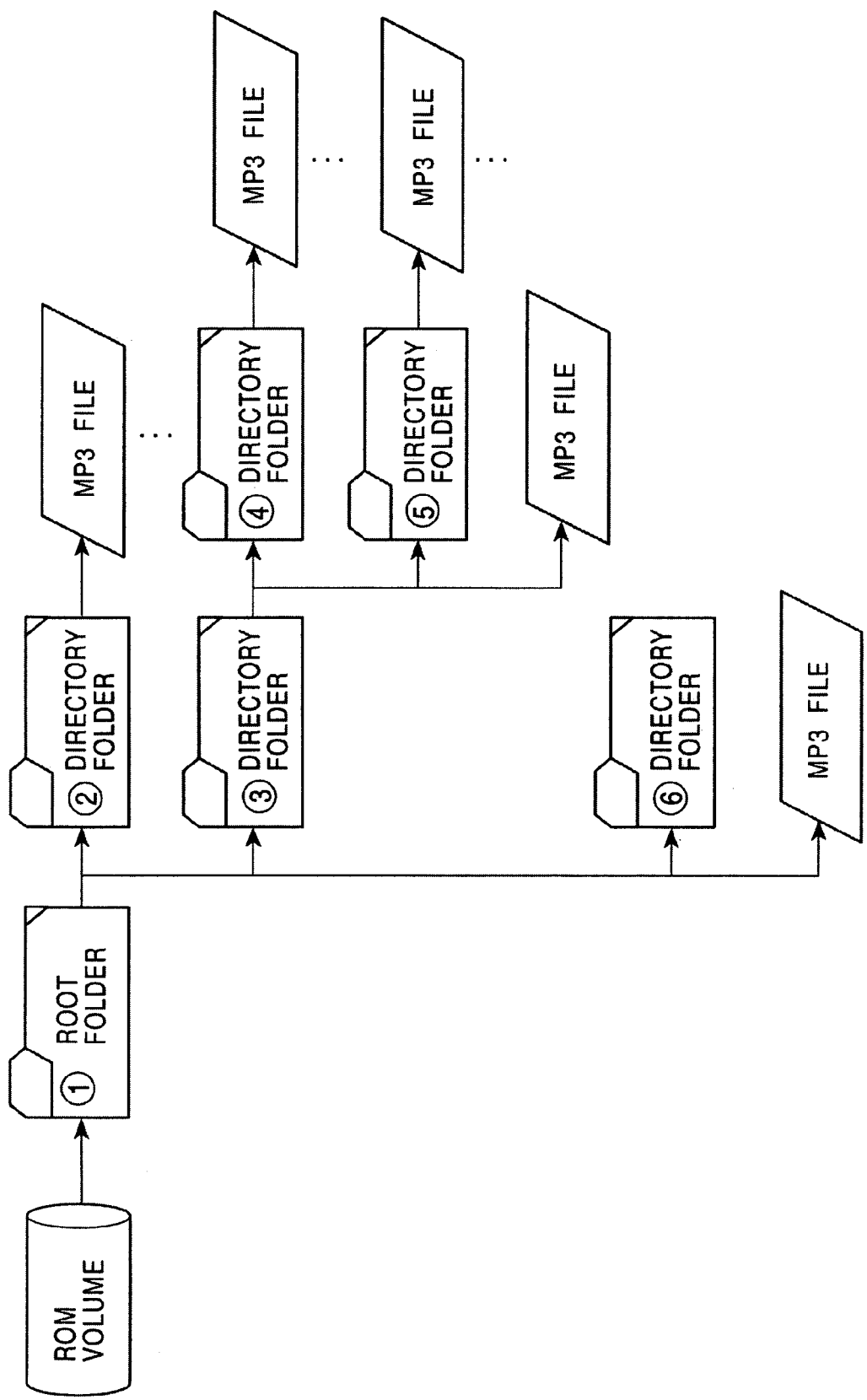
FIG. 2 shows an exemplary recording structure of music data on a disc.
Figure 4:
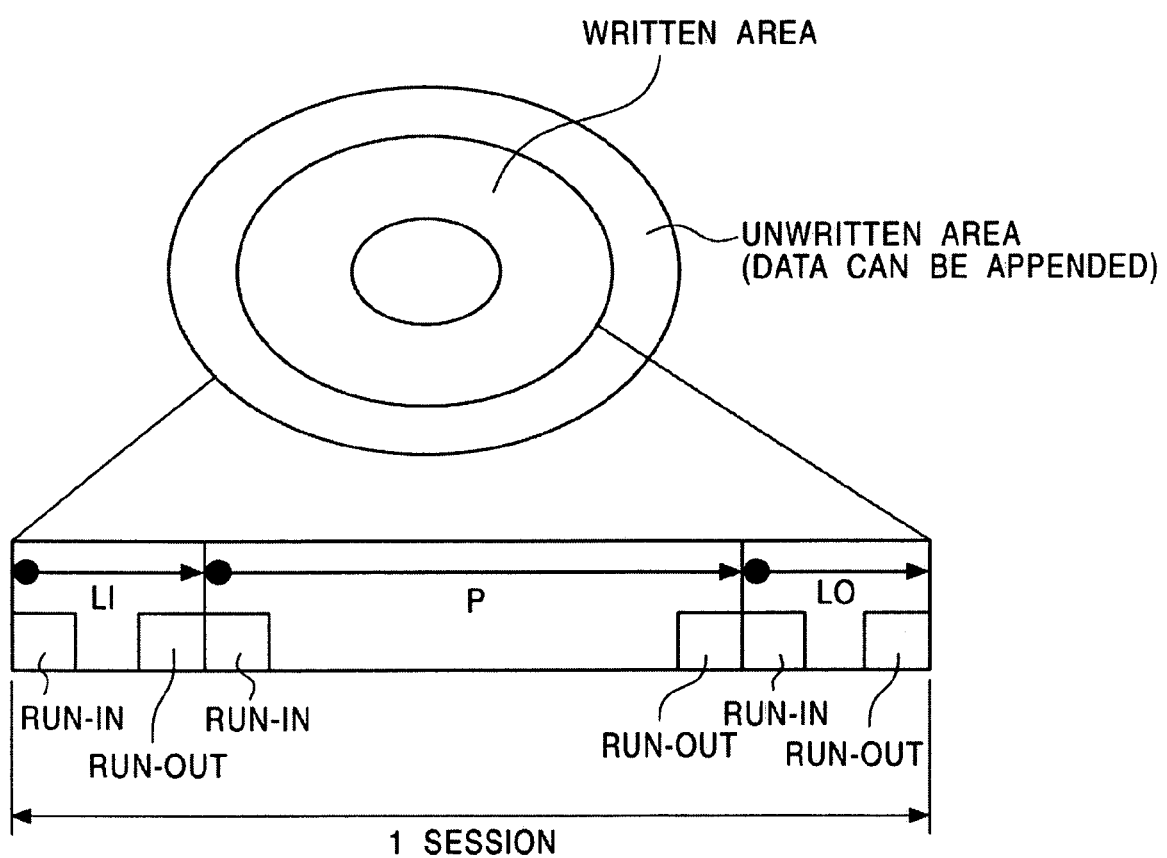
FIG. 4 is a diagram showing a single-session disc.
Figure 5:
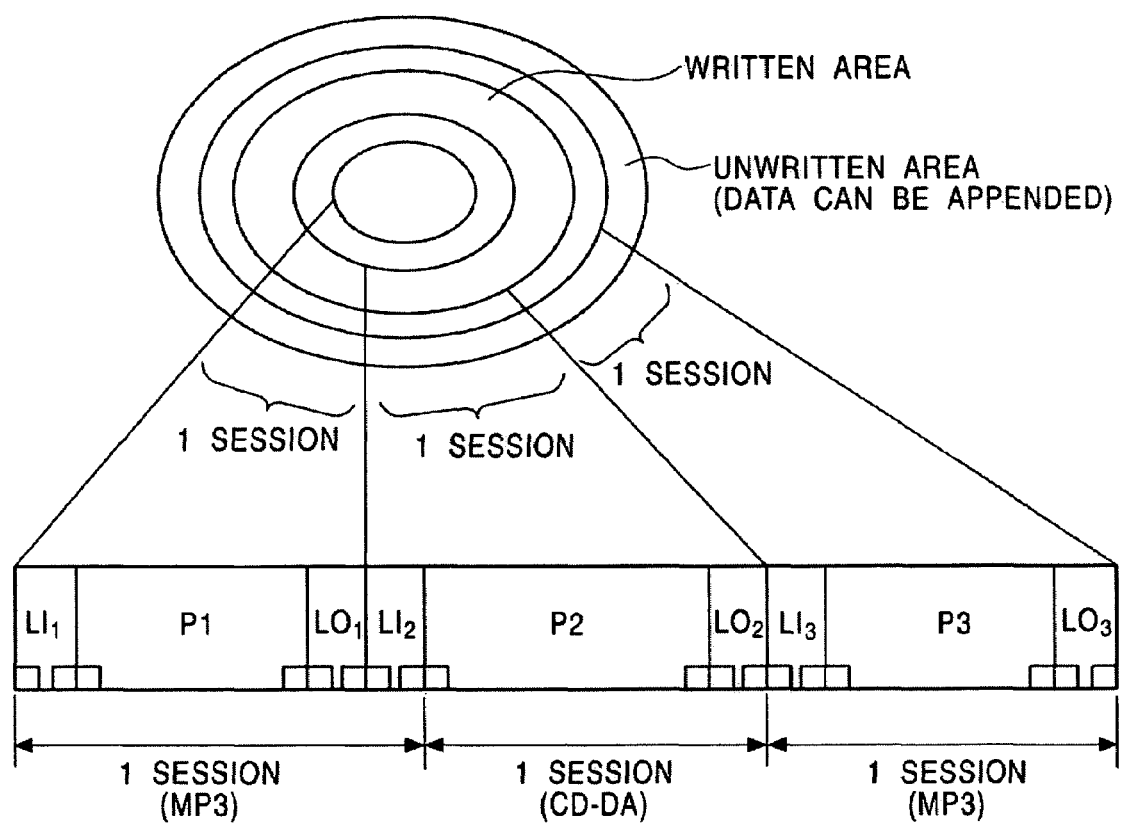
FIG. 5 is a diagram showing a multi-session disc.
Figure 6:
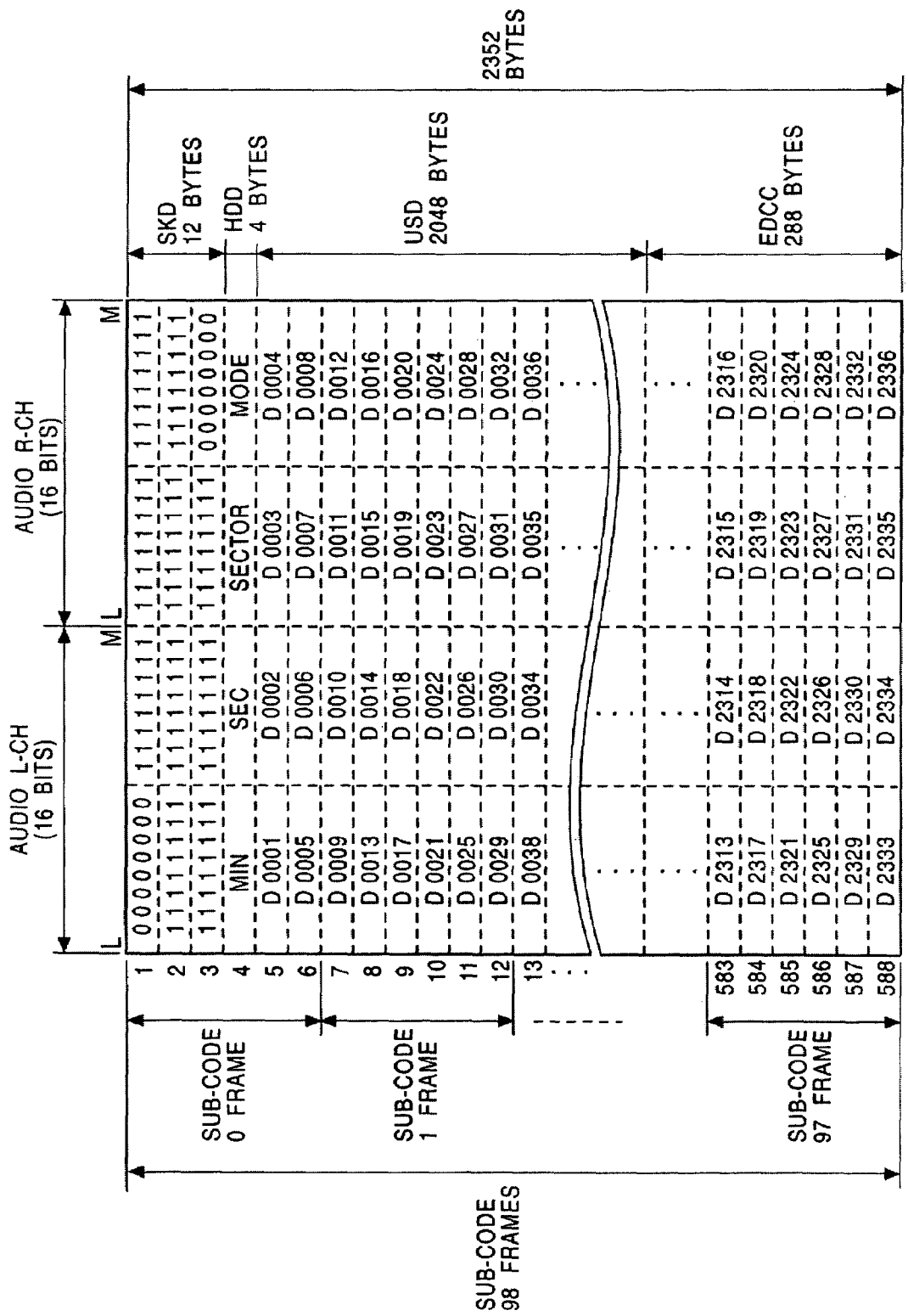
FIG. 6 shows the structure of a sector in a CD-ROM mode 1.
Figure 7C:
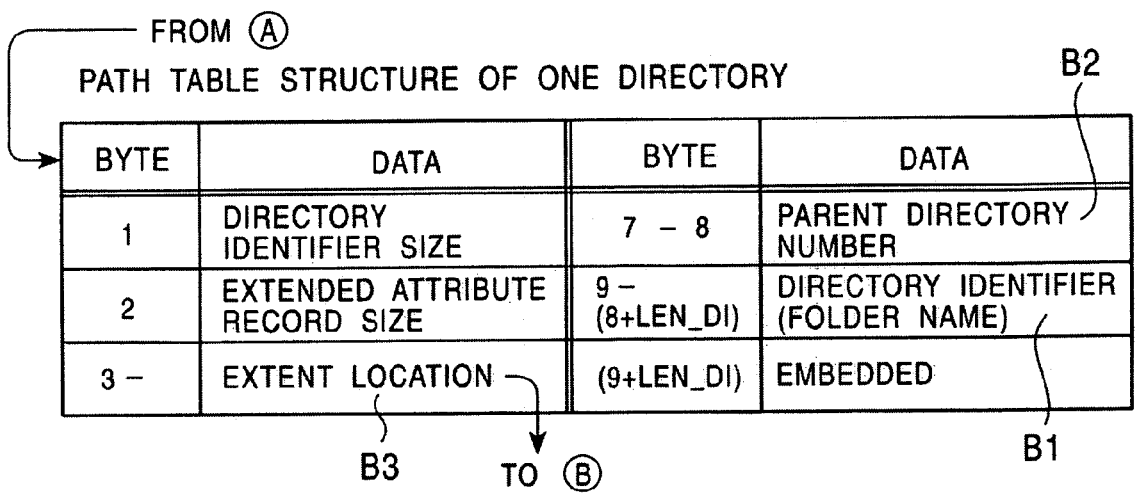
FIG. 7C shows the structure of a path table in the volume.
Figure 7D:
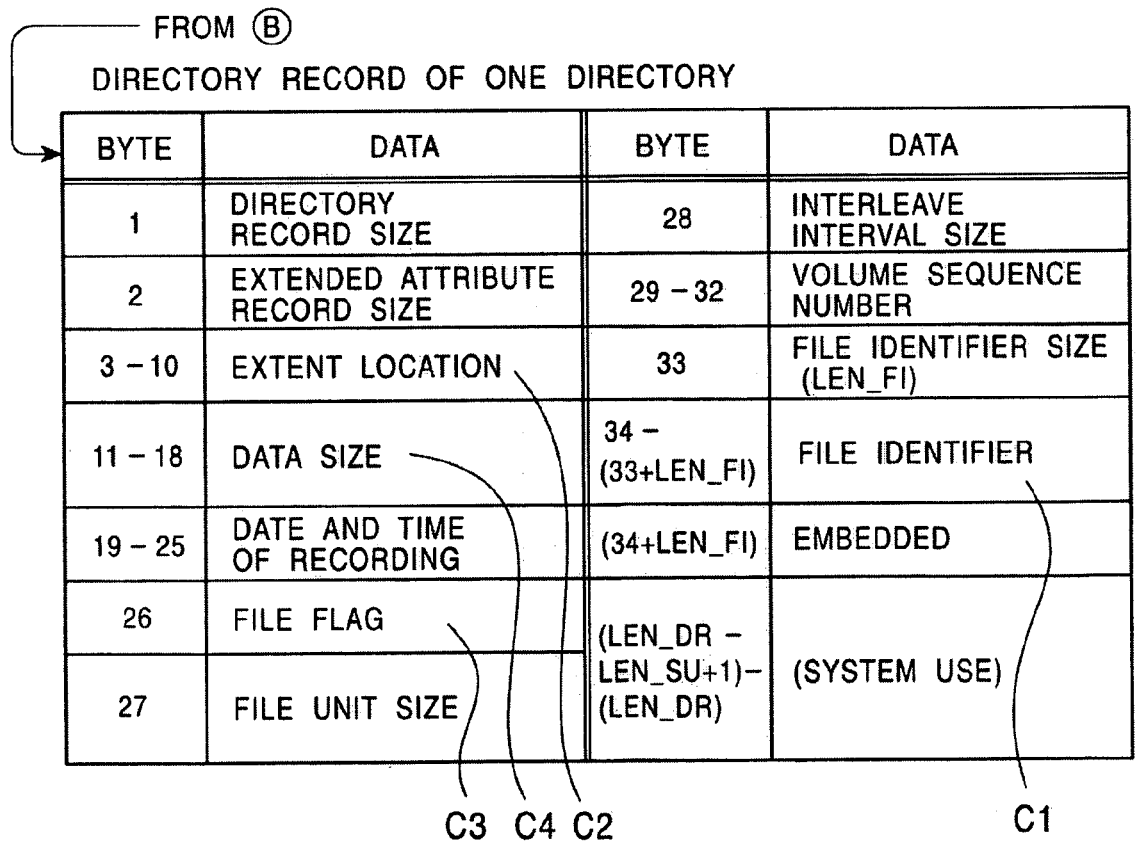
FIG. 7D shows the structure of a directory record of one directory.
Figure 8:
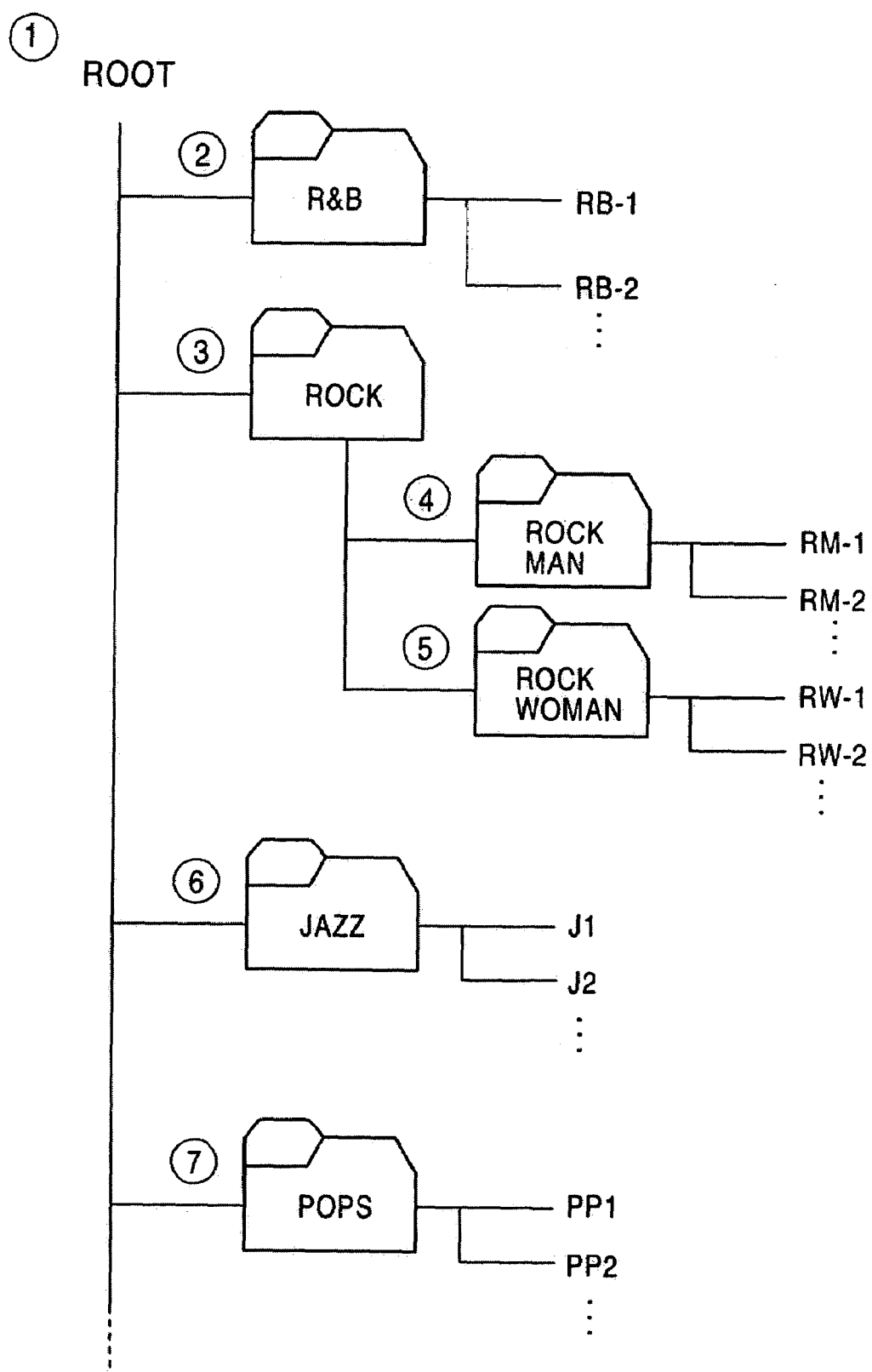
FIG. 8 shows an exemplary file structure.

FIG. 1 is a block diagram showing the structure of a disc player according to an embodiment of the present invention. The disc player holds, for example, a single-session disc 11 shown in FIG. 4 that has a recording structure of music data as shown in FIG. 2. Referring to FIG. 1, the disc player includes a turntable 12 on which the disc is loaded, a spindle motor 13 for rotating the disc at a constant linear velocity, an optical pickup 14 for detecting digital signals of the disc, a drive motor 15 for driving the optical pickup in the radial direction of the disc, a radio frequency (RF) amplifier 16, a servo circuit 17, and a digital signal processor 18. The RF amplifier 16 generates signals, such as eight-to-fourteen modulation (EFM) signals, error signals, and constant linear velocity (CLV) signals, from the digital signals detected by the optical pickup 14. The servo circuit 17 servo-controls the spindle motor 13 in accordance with instructions from a system controller 25 described below by using the error signals, such as a focus error signal and a tracking error signal, the CLV control signals, and so on and drives the optical pickup 14 in the radial direction of the disc. The digital signal processor 18 is synchronized with the EFM signals output from the RF amplifier 16, deinterleaves the EFM signals, and corrects errors in the EFM signals. The digital signal processor 18 demodulates audio sample data to feed the demodulated data to a shock-proof memory controller 20 and demodulates table-of-contents (TOC) information, sub-code data, and volume descriptors, path tables, and directories of the ISO9660 format before inputting them into the system controller 25.

The disc player according to an embodiment of the present invention includes a shock-proof memory (dynamic random access memory (DRAM)) 19 and the shock-proof memory controller 20. The shock-proof memory 19 temporarily stores ordinary uncompressed music data or MP3-compressed music data. The shock-proof memory controller 20 intermittently writes the uncompressed music data or the compressed music data into the shock-proof memory 19 at a high rate while successively reading it from the shock-proof memory 19 at an ordinary rate. When the shock-proof memory 19 becomes full (it contains the data more than a first predetermined amount), the shock-proof memory controller 20 notifies the system controller 25 of the full-of-data state and temporarily stops the writing of the data while continuing the reading of the uncompressed music data or the compressed music data. When a certain amount of room becomes available in the shock-proof memory 19 after some data is read by the shock-proof memory controller 20, that is, when the amount of the data in the shock-proof memory 19 is less than a second predetermined amount, the shock-proof memory controller 20 notifies the system controller 25 of the available room in the shock-proof memory 19 and resumes writing the uncompressed or compressed music data input from the digital signal processor 18.

The disc player also includes an MP3 decoder 21, a switch 22, a digital filter 23, and a D/A converter 24. The MP3 decoder 21 decompresses the MP3-compressed music data successively read from the shock-proof memory 19 by the shock-proof memory controller 20 to convert it into ordinary uncompressed music data. The switch 22 selectively outputs the ordinary uncompressed music data read from the shock-proof memory 19 by the shock-proof memory controller 20 or the ordinary uncompressed music data read from the MP3 decoder 21. The digital filter 23 performs, for example, over-sampling of the music data supplied from the switch 22. The D/A converter 24 converts the music data supplied from the digital filter 23 into analog data that is output to an external audio amplifier from an analog output terminal Aout.

The disc player includes the system controller 25. The system controller 25 analyzes the recording structure of the music data in a session and controls the playback of the disc. The disc player further includes a random access memory (RAM) 26 for storing the analysis result of the recording structure of the music data in the session; a display 27; and an operation unit 28 having various keys (a folder playback key FPK, a random key RMK, a repeat key RPK, a scan key SCK, and so on).

Figure 3:
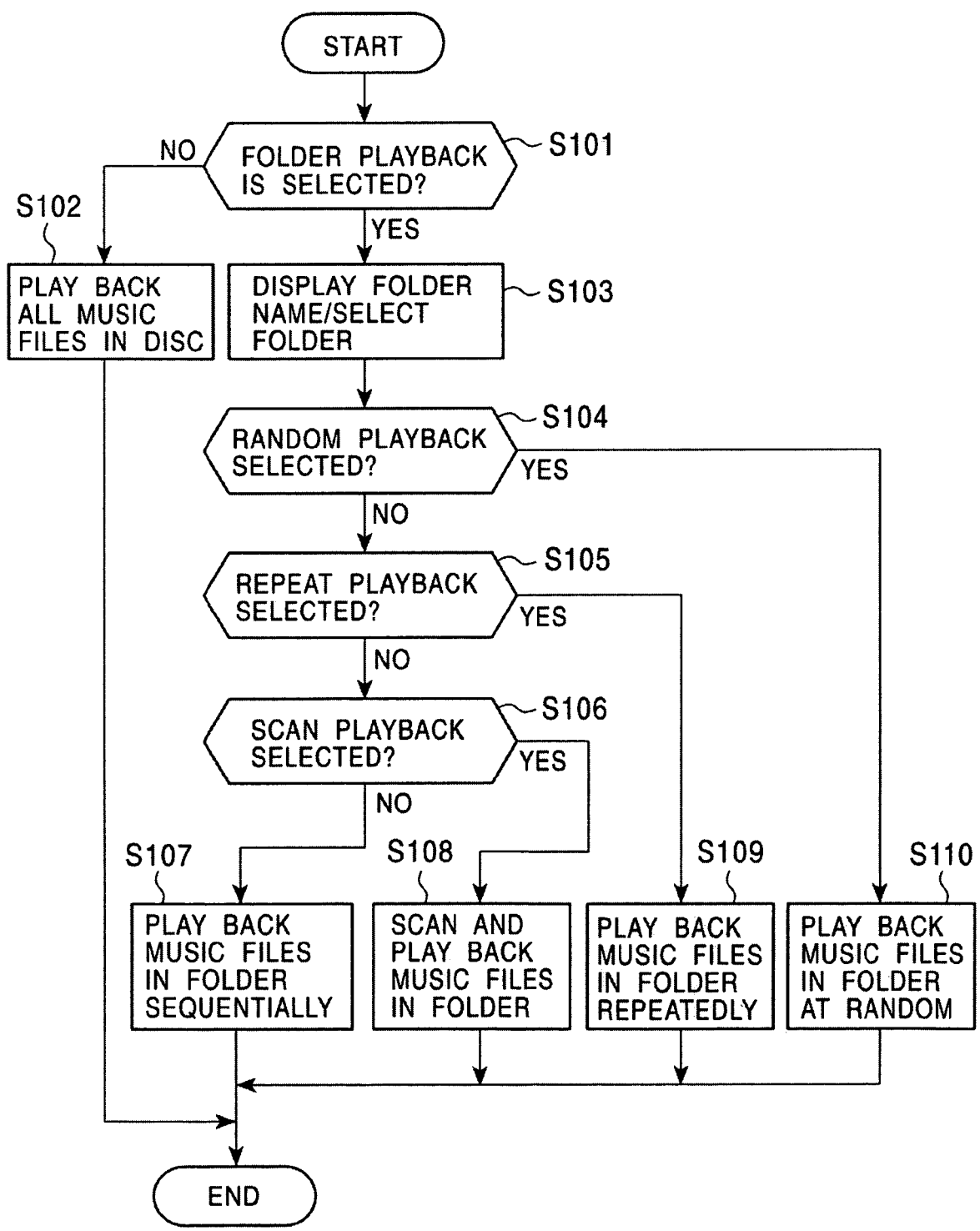
FIG. 3 is a flowchart of a folder playback process according to an embodiment of the present invention.

FIG. 3 is a flowchart of a folder playback process according to an embodiment of the present invention.

First, a single-session disc including MP3-compressed music data is recorded in a CD-ROM format is loaded in the disc player. The system controller 25 analyzes the structures of primary volume descriptors, path tables, and directories recorded in a lead-in area of the disc to determine the recording structure of the disc and stores it in the RAM 26. In act S101, the system controller 25 determines whether a folder playback mode is selected. When the folder playback mode is not selected, in act S102, the disc player sequentially plays back all music files in the disc (disc playback mode).

When the folder playback mode is selected with the FPK key, the system controller 25 displays the names of folders to be played back in the display 27. In act S103, a user selects a certain folder or certain folders from the displayed folder names. The system controller 25 sequentially determines whether a folder random playback mode is selected with the RMK key in act S104, whether a folder repeat playback mode is selected with the RPK key in act S105, and whether a folder scan playback mode is selected with the SCK key in act S106.

If neither the folder random playback mode, the folder repeat playback mode, and the folder scan playback mode is selected, in act S107, the system controller 25 controls the disc player so that the disc player sequentially plays back the music files in the specified folder. When the folder scan playback mode is selected, in act S108, the system controller 25 controls the disc player so that the disc player sequentially scans and plays back the first few seconds of each music file in the folder. When the folder repeat playback mode is selected, in act S109, the system controller 25 controls the disc player so that the disc player repeatedly plays back at least one music file in the folder. When the folder random playback mode is selected, in act S110, the system controller 25 determines an order of playing back all the music files in the folder and controls the disc player so that the disc player plays back the music files in the folder in the determined order.

In order to clear the folder playback mode, the FPK key is pressed again. Furthermore, when the disc player is turned on, it is preset to the disc playback mode.

The present invention may also be applied to each session in a multi-session disc, since each session in the multi-session disc corresponds to a single-session disc.

When the folder playback mode is selected while the disc is played back in the disc playback mode, the folder being played back becomes the target folder for the folder playback mode and it is not necessary to specify a target folder.

A folder can be specified by any method. For example, the folder structure in FIG. 2 is displayed to select a desired folder by the touch of a finger.

The invention claimed is:

1. A disc player for playing back a disc that includes a plurality of folders, each folder including music files, the disc player comprising:
    an MP3 decoder;
    a digital filter, the digital filter operable to filter music data supplied by the MP3 decoder;
    a digital-to-analog converter operable to convert music data from the digital filter into analog signals that may be outputted as audio signals;
    a system controller, the system controller operable to analyze a recording structure of music data in a session on the disc and to operate in a folder playback mode; and
    memory operable to store the results of the system controller's analysis of the recording structure on the disc;
    wherein when the system controller operates in folder playback mode, the system controller plays back a first few seconds of a file in a folder on the disc, then proceeds to play back a first few seconds of another file in the folder on the disc, and continues to play back a few first seconds of each other file in the folder on the disc until the first few seconds of all files in the folder have been played back.

2. The disc play of claim 1, further comprising a scan key, the scan key operable to instruct the system controller to operate in a folder scan playback mode.

3. The disc player of claim 1, further comprising a display operable to display the name of the folder selected for play back in the folder scan playback mode.

4. The disc player of claim 1, wherein the disc is a multi-session disc.

* * * * *